Patented Mar. 21, 1950

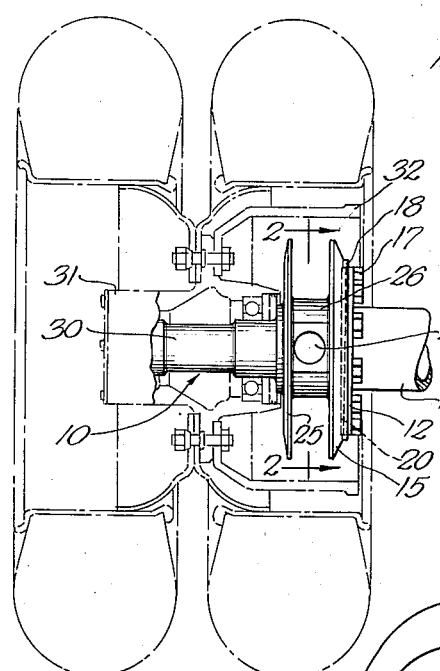
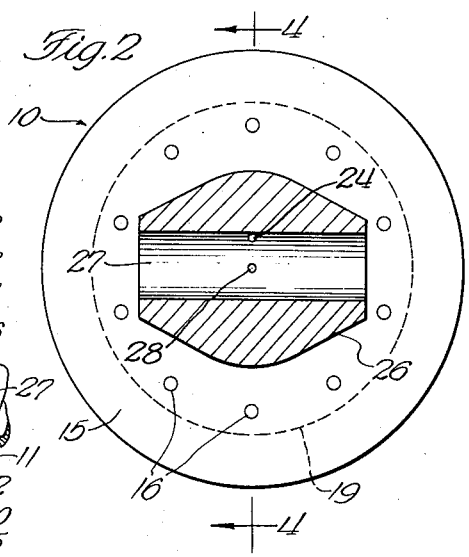
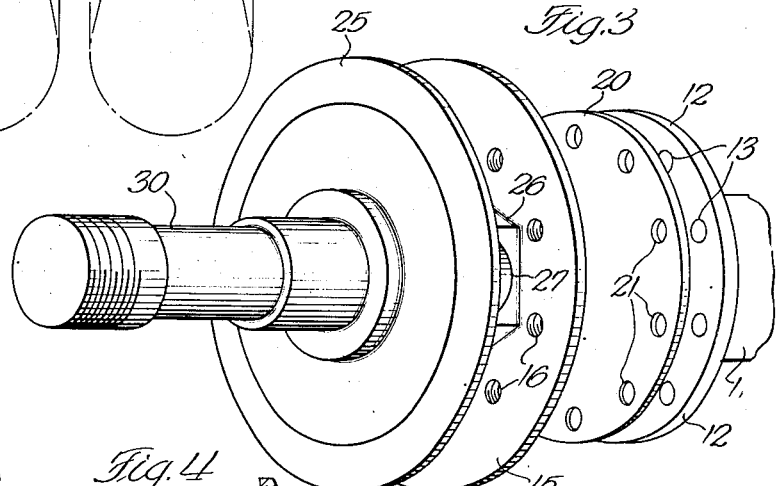
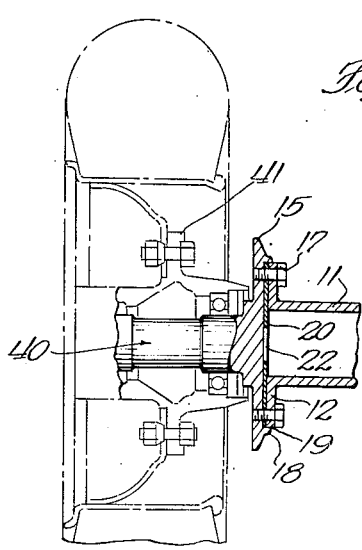
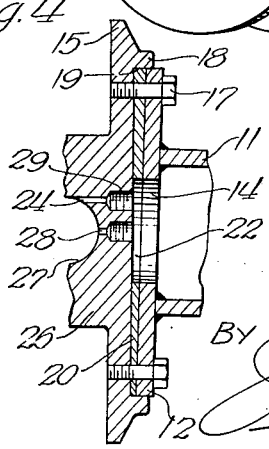

2,501,579

UNITED STATES PATENT OFFICE 2,501,579

REMOVABLE AXLE SPINDLE

Robert W. Pointer, Portland, Oreg.

Application December 12, 1945, Serial No. 634,426

9 Claims. (Cl. 188—206)

This invention relates to a removable wheel spindle for mounting on the end of a vehicle axle beam.

The general object of the invention is to provide a removable one-piece spindle of simplified construction which is more economical to manufacture than conventional spindles which are made as an integral part of the axle beam.

Another object is to provide a removable axle spindle wherein all the machining operations may conveniently be performed on a relatively short piece of stock with a high degree of accuracy.

Another object is to provide demountable spindles on an axle so constructed and arranged that in the event of damage to either the axle or one of the spindles only the damaged part need be replaced.

Another object is to provide an improved spindle adapted to mount a brake mechanism directly on integral parts of the spindle so as to reduce the number of separate parts required for a complete spindle and brake assembly.

Another object is to provide an axle spindle adapted to mount and contain all movable parts of the brake mechanism within the wheel assembly so as to leave the axle beam free and clear for mounting any desired type of spring suspension.

Another object is to provide a removable axle spindle for use with a hollow tubular axle beam wherein all the brake operating instrumentalities are enclosed within the axle and spindle assembly.

Another object is to provide an axle spindle designed to facilitate the changing and relining of brake shoes.

Another object is to provide a stronger spindle adapted to mount stronger brake shoes than in conventional constructions.

Still another object is to provide an axle and spindle assembly wherein the track width may be changed without requiring new spindles or new axles.

A still further object is to provide an axle and spindle combination having adjustable camber and alignment.

The invention is embodied in a spindle having an end flange adapted to be secured to an end flange on an axle beam. In one embodiment a second flange is provided on the spindle in spaced relation to the end flange whereby brake shoes may be mounted between the two flanges. Such brake shoes preferably have web portions of a width to fit loosely between the flanges and be guided thereby, and have arcuate outer faces extending beyond the flanges for carrying the usual brake linings. This arrangement permits the individual brake shoes to be mounted for radial and rocking movements upon anchor bolts extending through the two flanges, which bolts may comprise certain of the screws employed for mounting the spindle on the axle beam flange. A wheel assembly having a brake drum surrounding these flanges and the brake shoes is mounted on suitable bearings on the outer end of the spindle so that the brake mechanism is entirely enclosed within the wheel and spindle assembly.

The above described arrangement is particularly suited for hydraulic brakes where, as in the practice of the present invention, the actuating cylinder may be contained in a transverse diametral bore within an enlarged central portion of the spindle between the two flanges. Oppositely disposed pistons acting in the common cylinder may be arranged to move radially outwardly between the ends of a pair of brake shoes mounted as above described to force the brake linings into engagement with the brake drum to exert a braking effect. The hydraulic pipe line for the brake cylinder in each spindle may then be contained within the axle beam, if it is of tubular construction, thereby leaving the outside of the axle free for any type of resilient suspension mounting which may be desired.

A brake mechanism of this type is disclosed and claimed in my copending application for Brake mechanism, Serial No. 612,741, filed August 27, 1945. In my copending application modifications are disclosed having the brake cylinder disposed in an axial position in a tubular axle beam, in which either two or more brake shoes may be actuated by radial push rods between the spindle flanges. These and other modifications of the spindle within the scope of the appended claims are included in the present invention.

In the drawings:

Figure 1 is a side view of a removable axle spindle constructed according to the present invention, mounted on the end of an axle beam, and showing in phantom a wheel mounted on the spindle;

Figure 2 is a cross sectional view taken on the line 2—2 of Figure 1;

Figure 3 is an exploded view in perspective showing the removable spindle of Figure 1, a spacing disc, and the end of the axle beam on which these parts are mounted;

Figure 4 is a fragmentary sectional view taken on the line 4—4 of Figure 2; and

Figure 5 is a view similar to Figure 1, showing a modified removable spindle for a non-braking wheel.

The removable spindle in Figure 1 is indicated generally by the numeral 10, and the axle beam on which it is mounted is indicated by the numeral 11. For mounting this spindle the axle beam 11 is equipped with an end flange 12 having a circle of mounting holes 13 near its periphery and a central opening 14 communicating with the interior of the axle beam. The spindle 10 has a mounting flange 15 formed on its inner end, and in this flange is a circle of threaded holes 16 for receiving cap screws 17 through the holes 13. A circular rim 18 on the axle side of the flange 15 defines a recess 19 into which the axle flange 12 seats when the parts are mounted and assembled.

While the axle flange 12 may seat directly against the mounting flange 15, it may be preferred in the practice of the invention to insert a thin wedge shaped spacing disc 20 therebetween in the manner shown in Figure 4. The disc 20 is also provided with holes 21 for the screws 17 and a central opening 22 as large or larger than the opening 14. The disc 20 need not be of metal, and may be manufactured with different tapers to impart the desired camber to the spindle and to compensate for a permanent set or deformation in a damaged axle beam thereby to obviate the necessity for straightening the axle to correct relatively small errors in alignment. For this purpose the discs 20 may be made very thin on one side, but relatively thick discs may also be employed for the purpose of increasing the tread or track width of the wheels.

Spaced from the flange 15 is another flange 25, the spindle having an enlarged lobe 26 therebetween. The lobe 26 contains a transverse cylindrical bore 27 constituting a power cylinder for operating brake shoes mounted between the flanges, the brake mechanism preferably being of the type disclosed and claimed in my copending application. In a mid portion of the wall of cylinder 27 there is an opening 28 tapped at 29 to receive a hydraulic brake line through the openings 14 and 22 in the flange 12 and disc 20. The spindle is preferably mounted on the axle with the bore 27 in a horizontal position whereby the air in the bore may be bled through an opening 24 when the hydraulic system is filled or serviced. This opening is tapped at 29 for connection with a bleed pipe. The lobe 26 may take other forms to accommodate different types of brake operating mechanism as disclosed in my copending application.

In each of these brake mechanisms the spaced flanges 15 and 25 constitute means for mounting two or more brake shoes therebetween and for guiding and supporting the shoes when the brakes are applied and released. Preferably, each shoe is floatingly mounted for radial and rocking movements on the elongated shank of one of the screws 17 which is made long enough to extend into the flange 25 for end support. There would thus be one long screw 17 for each brake shoe, the remaining screws 17 terminating in the flange 15 as shown in Figure 4. The brake mechanism is not included in the present disclosure, however, reference being made thereto only for the purpose of explaining the features of the spindle construction which is specifically designed to mount such a mechanism.

The outer end 30 of the spindle is formed in conventional shape for mounting wheel bearings for a wheel 31 having a brake drum 32 surrounding the flanges 15 and 25 for co-operation with brake shoes mounted therebetween. The complete spindle, including the flanges 15 and 25, the lobe 26, and the end 30, are preferably cast or forged from steel in an integral piece. This mode of construction provides an exceptionally sturdy and rugged spindle and at the same time facilitates the machining operations thereon by eliminating the unwieldy axle beam. If the spindle becomes damaged in use it may easily be replaced by ordinary mechanic's tools without dismantling the axle from the vehicle. If the axle becomes slightly bent from overloading or by reason of the vehicle having been involved in an accident, it may still possess its original strength and be suitable for continued use after correction of the spindle alignment by means of inserting discs 20 having a compensating taper.

The modified spindle shown in Figure 5 may be used for mounting non-braking wheels. Here the spindle 40 is provided with the single flange 15 for mounting either directly on the axle flange 12 or in combination with the disc 20. Mounted on the spindle 40 is a wheel 41 without a brake drum. Brake mechanism may easily be installed on such an axle by merely substituting a spindle 10 for the spindle 40 and connecting up the hydraulic brake lines. The spindle 40 possesses all the other features and advantages described in connection with the spindle 10.

Having now described my invention and in what manner the same may be used, what I claim as new and desire to protect by Letters Patent is:

1. A removable axle spindle comprising an end flange, means on said flange for securing said spindle to the end of an axle beam, a second flange on the spindle spaced from said end flange, and a spindle end adapted to mount a wheel thereon.

2. A removable axle spindle comprising a pair of spaced flanges on the spindle, one of said flanges being adapted to mount said spindle on the end of an axle beam, and a spindle end adapted for mounting wheel bearings.

3. A removable axle spindle comprising a pair of spaced integral flanges on the spindle adapted to mount brake shoes therebetween, one of said flanges being further adapted for mounting on the end of an axle beam, means between said flanges for mounting brake operating instrumentalities, and a spindle end for mounting a wheel on said spindle.

4. A removable axle spindle containing a transverse bore, and flanges on said spindle on opposite sides of said bore for mounting a plurality of brake shoes in the plane of said bore.

5. A removable axle spindle comprising a pair of spaced flanges adapted to receive a plurality of brake shoes therebetween, and a transverse bore extending through said spindle in a plane intermediate said flanges.

6. An axle spindle comprising a mounting flange on one end of the spindle, a second flange axially spaced therefrom, and a transverse bore in said spindle opening at its opposite ends between said flanges.

7. An axle spindle having an end flange adapted for mounting on an axle beam, a second flange spaced from said end flange, and a bore in the shank portion of said spindle between said flanges, said shank being widened in the direction of said bore, and a spindle end adapted for mounting a wheel on said spindle.

8. An axle construction comprising a hollow axle beam, a flange plate on the end of said beam, a central opening in said flange plate communicating with the interior of said beam, a removable wheel spindle attached to said flange plate, a brake cylinder in said spindle, connections in said spindle for receiving hydraulic pressure and bleed lines for said cylinder through said opening, and a pair of spaced flanges on said spindle for mounting brake shoes in operative relation to said brake cylinder.

9. An axle construction comprising a hollow axle beam adapted to contain brake operating means, a flange plate on the end of said axle beam, a central opening in said flange plate communicating with the interior of said beam, a removable wheel spindle having a flange for mounting on said axle flange, a second flange on said spindle spaced from said first flange for mounting brake shoes and brake mechanism therebetween, an opening in said spindle communicating radially with the space between said flanges and communicating axially with the interior of said hollow axle to contain brake operating instrumentalities connected with said brake operating means in said axle, and a centrally apertured spacer disc interposed between said spindle and axle flanges to adjust the position of said spindle on said axle without affecting the operation of said brake mechanism.

ROBERT W. POINTER.

REFERENCES CITED

The following references are of record in the file of this patent:

UNITED STATES PATENTS

| Number | Name | Date |
|---|---|---|
| 708,466 | Davis | Sept. 2, 1902 |
| 774,042 | Cooper | Nov. 1, 1904 |
| 774,289 | Thomas | Nov. 8, 1904 |
| 1,076,311 | Perrot | Oct. 21, 1913 |
| 1,162,737 | Arnold | Dec. 7, 1915 |
| 1,475,781 | Batterman | Nov. 27, 1923 |
| 1,723,141 | Down | Aug. 6, 1929 |
| 1,768,183 | Wine | June 24, 1930 |
| 1,961,174 | Silver | June 5, 1934 |
| 2,019,508 | Sauzedde | Nov. 5, 1935 |
| 2,213,383 | Canfield | Sept. 3, 1940 |
| 2,423,011 | Du Bois | June 24, 1947 |

FOREIGN PATENTS

| Number | Country | Date |
|---|---|---|
| 550,131 | France | Dec. 6, 1922 |